US008964233B2

(12) United States Patent
Wakizaka et al.

(10) Patent No.: US 8,964,233 B2
(45) Date of Patent: Feb. 24, 2015

(54) COMMUNICATION DEVICE AND NON-TRANSITORY COMPUTER-READABLE STORAGE MEDIUM STORING PROGRAM FOR CONTROLLING THE COMMUNICATION DEVICE

(71) Applicants: Masaaki Wakizaka, Ichinomiya (JP); Shoji Sato, Nagoya (JP); Koji Akagi, Inazawa (JP); Akikazu Murata, Gifu-ken (JP)

(72) Inventors: Masaaki Wakizaka, Ichinomiya (JP); Shoji Sato, Nagoya (JP); Koji Akagi, Inazawa (JP); Akikazu Murata, Gifu-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/205,454

(22) Filed: Mar. 12, 2014

(65) Prior Publication Data

US 2014/0293328 A1 Oct. 2, 2014

(30) Foreign Application Priority Data

Mar. 29, 2013 (JP) .................................. 2013-072171

(51) Int. Cl.
*G06F 15/00* (2006.01)
*G06F 3/12* (2006.01)
*G06K 1/00* (2006.01)
*H04N 1/00* (2006.01)
*G06K 15/00* (2006.01)

(52) U.S. Cl.
CPC .......... *H04N 1/00411* (2013.01); *G06F 3/1253* (2013.01); *G06F 3/1292* (2013.01)
USPC ........................................ 358/1.15; 358/1.14

(58) Field of Classification Search
CPC .. H04N 1/00411; G06F 3/1253; G06F 3/1292
USPC ................................ 358/1.15, 1.14, 1.13, 1.1
See application file for complete search history.

(56) References Cited

U.S. PATENT DOCUMENTS

| 2013/0098986 | A1* | 4/2013 | Kwon et al. ................... 235/375 |
| 2013/0258382 | A1* | 10/2013 | Sato .............................. 358/1.13 |
| 2014/0105397 | A1* | 4/2014 | Ikeda et al. .................... 380/270 |

FOREIGN PATENT DOCUMENTS

| JP | 2007-166538 A | 6/2007 |
| JP | 2012-160207 A | 8/2012 |

* cited by examiner

*Primary Examiner* — Douglas Tran
(74) *Attorney, Agent, or Firm* — Scully, Scott, Murphy & Presser, PC

(57) ABSTRACT

A communication device, including: a near field communicator configured to perform near field communication with an information processing terminal; a display configured to display an image; and a controller configured to execute specific processing in which the controller obtains data from the information processing terminal utilizing the near field communication and executes process in accordance with the obtained data, wherein the controller is configured to determine, when an image is being displayed on the display, whether displayed-image-based processing that is processing in accordance with the image displayed on the display is the specific processing, and wherein the controller is configured to inactivate a communication function of the near field communicator if it is determined that the displayed-image-based processing is not the specific processing and to activate the communication function of the near field communicator if it is determined that the displayed-image-based processing is the specific processing.

11 Claims, 9 Drawing Sheets

FIG.9

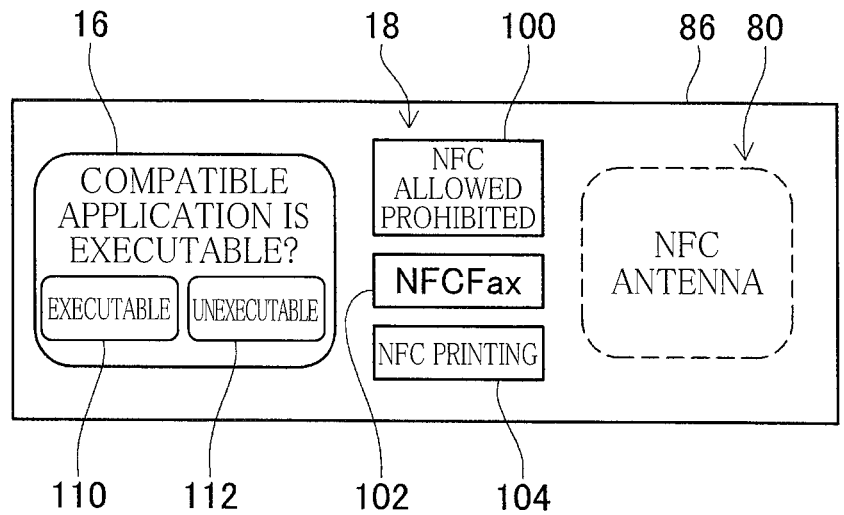

FIG.10

| DISPLAYED SCREEN | COMPATIBLE APPLICATION | NON-COMPATIBLE APPLICATION |
|---|---|---|
| MODE SELECTING SCREEN | NFC COMMUNICATION NOT REQUIRED | NFC COMMUNICATION NOT REQUIRED |
| NUMBER TRANSMISSION SCREEN | NFC COMMUNICATION REQUIRED | NFC COMMUNICATION REQUIRED |
| SETTING CHANGE SCREEN | NFC COMMUNICATION REQUIRED | NFC COMMUNICATION NOT REQUIRED |
| IMAGE TRANSMISSION SCREEN | NFC COMMUNICATION REQUIRED | NFC COMMUNICATION REQUIRED |
| COMMUNICATION EXECUTION SCREEN | NFC COMMUNICATION REQUIRED | NFC COMMUNICATION REQUIRED |

COMMUNICATION DEVICE AND NON-TRANSITORY COMPUTER-READABLE STORAGE MEDIUM STORING PROGRAM FOR CONTROLLING THE COMMUNICATION DEVICE

CROSS REFERENCE TO RELATED APPLICATION

The present application claims priority from Japanese Patent Application No. 2013-072171, which was filed on Mar. 29, 2013, the disclosure of which is herein incorporated by reference in its entirety.

BACKGROUND OF THE INVENTION

1. Field of the Invention

The present invention relates to a communication device configured to perform near field communication with an information processing terminal and a computer-readable storage medium storing a program for controlling the communication device.

2. Description of Related Art

There have been conventionally developed communication devices capable of performing near field communication with information processing terminals such as smartphones and tablet personal computers. In the near field communication, transmission and reception of data can be performed by merely bringing the information processing terminal near to the communication device.

SUMMARY OF THE INVENTION

As described above, the near field communication is a very useful technique. Where the technique is used in communication devices, the utility of the communication devices is enhanced. However, if the communication function for the near field communication is always enabled, the electric power consumption amount will be increased. That is, if the communication device is always kept in a state in which the communication device can transmit and receive a radio wave used in the near field communication, the electric power is wastefully consumed. The present invention has been developed in view of such situations. It is therefore an object of the invention to provide a technique of suppressing electric power consumption in a communication device capable of performing near field communication with an information processing terminal.

The object indicated above may be attained according to one aspect of the invention, which provides a communication device, comprising: a near field communicator configured to perform near field communication with an information processing terminal present in a communication area in which near field communication is possible, the information processing terminal being capable of performing the near field communication; a display configured to display an image; and a controller configured to control the communication device and to execute specific processing in which the controller obtains data from the information processing terminal utilizing the near field communication and executes process in accordance with the obtained data, wherein the controller is configured to determine, when an image is being displayed on the display, whether displayed-image-based processing that is processing in accordance with the image displayed on the display is the specific processing, and wherein the controller is configured to inactivate a communication function of the near field communicator if it is determined that the displayed-image-based processing is not the specific processing and to activate the communication function of the near field communicator if it is determined that the displayed-image-based processing is the specific processing.

The object indicated above may be attained according to another aspect of the invention, which provides a non-transitory computer-readable storage medium in which is stored a program to be executed by a computer of a communication device, comprising: a near field communicator configured to perform near field communication with an information processing terminal present in a communication area in which near field communication is possible, the information processing terminal being capable of performing the near field communication; and a display configured to display an image, wherein the program permits the computer to function as a controller configured to execute specific processing in which the controller obtains data from the information processing terminal utilizing the near field communication and executes process in accordance with the obtained data, and wherein the program permits the computer to function as a controller configured to: determine, when an image is being displayed on the display, whether displayed-image-based processing that is processing in accordance with the image displayed on the display is the specific processing, and inactivate a communication function of the near field communicator if it is determined that the displayed-image-based processing is not the specific processing and activate the communication function of the near field communicator if it is determined that the displayed-image-based processing is the specific processing.

BRIEF DESCRIPTION OF THE DRAWINGS

The above and other objects, features, advantages and technical and industrial significance of the present invention will be better understood by reading the following detailed description of an embodiment of the invention, when considered in connection with the accompanying drawings, in which:

FIG. 9 is a view showing the panel 16, the button input portion 18, and the antenna portion 80 of the MFP 10;

FIG. 10 is a table showing a relationship between displayed screen and necessity or unnecessity of processing in accordance with NFC communication;

DETAILED DESCRIPTION OF THE EMBODIMENT

<Embodiment>

Figure 1:
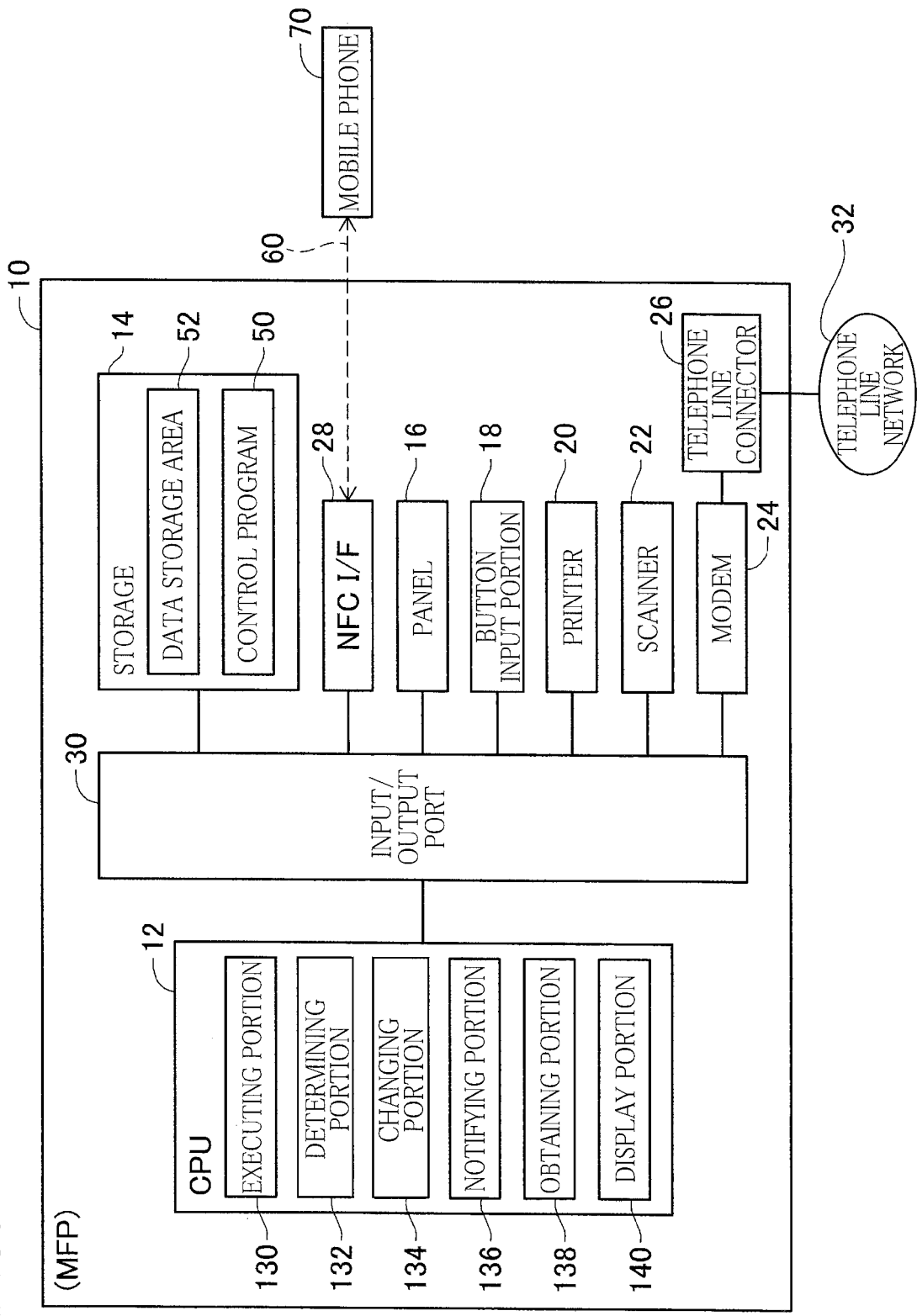
FIG. 1 is a block diagram of an MFP 10.
Figure 2:
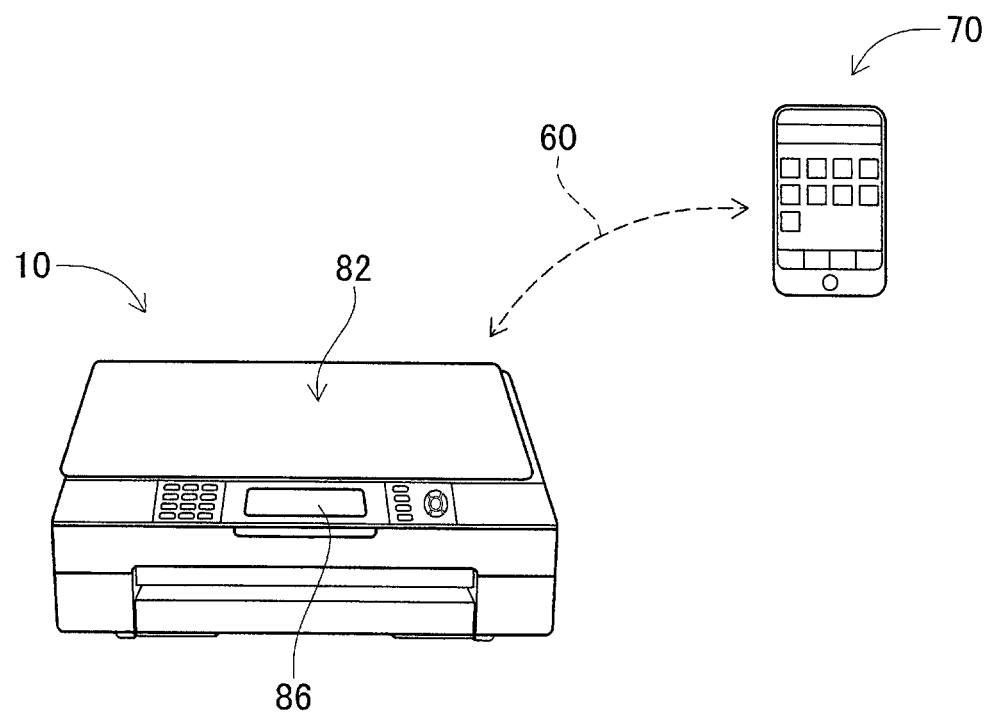
FIG. 2 is a perspective view of the MFP 10.

FIG. 1 is a block diagram of a Multifunction Peripheral (MFP) (as one example of a communication device in the present invention) 10 according to one embodiment of the present invention. FIG. 2 is a perspective view of the MFP 10. The MFP 10 mainly includes a Central Processing Unit (CPU) (as one example of a controller and one example of a computer) 12, a storage (as one example of a first storage and one example of a second storage) 14, a panel (as one example of a display) 16, a button input portion 18, a printer 20, a scanner 22, a modem 24, a telephone line connector 26, an NFC (Near Field Communication) I/F (as one example of a near field communicator) 28. These components are communicably coupled to one another via an input/output port 30.

The panel 16 has a display surface on which various functions of the MFP 10 are to be displayed. The display surface is formed as a touch panel of pressure-sensitive type. The button input portion 18 includes touch sensors and is configured to detect an approach or a touch of an input tool such as a finger of a user to or on the button input portion 18 and to accept a button operation by a user.

The printer 20 is configured to perform printing. The scanner 22 is configured to scan a document to form scan data. The modem 24 is configured to convert document data to be sent by a facsimile function into a signal transmittable to a telephone line network 32 and to send the signal to the telephone line network 32 via the telephone line connector 26. The modem 24 is also configured to receive a signal from the telephone line network 32 via the telephone line connector 26 and to decode the signal into document data.

The CPU 12 is configured to execute processing according to a control program (as one example of a program) 50 stored in the storage 14. The control program 50 is a program for performing facsimile communication and the like utilizing wireless communication, as explained later in detail. It is noted that the storage 14 is constituted by a combination of a Random Access Memory (RAM), a Read Only Memory (ROM), a flash memory, a hard disc (HDD), a buffer of the CPU 12, and so on.

The storage 14 has a data storage area 52. The data storage area 52 is an area for storing various data such as image data for displaying an image on the panel 16 and data necessary for execution of the control program 50.

The NFC I/F 28 is configured to be capable of performing wireless communication 60 according to NFC (near field communication) with a mobile phone 70 (as one example of an information processing terminal) based on the international standard ISO/IEC21481 or ISO/IEC18092. That is, the MFP 10 is capable of performing data communication directly with the mobile phone 70 when the wireless communication 60 according to NFC is available.

<Operation of MFP>

As described above, the MFP 10 is capable of performing the wireless communication 60 according to NFC (hereinafter referred to as NFC communication where appropriate) via the NFC I/F 28 and is accordingly capable of performing data communication directly with the mobile phone 70. More specifically, the NFC I/F 28 includes an antenna portion 80 configured to transmit and receive a radio wave used in the wireless communication 60 with the mobile phone 70. As shown in FIG. 2, an operation region 86 is provided on an upper surface of a body 82 of the MFP 10, and the antenna portion 80 is disposed in the operation region 86.

Figure 3:
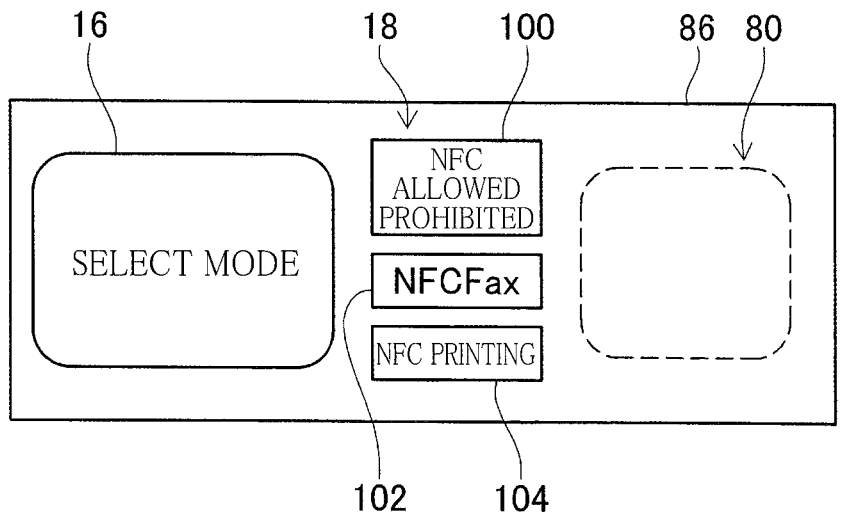
FIG. 3 is a view showing a panel 16, a button input portion 18, and an antenna portion 80 of the MFP 10.
Figure 4:
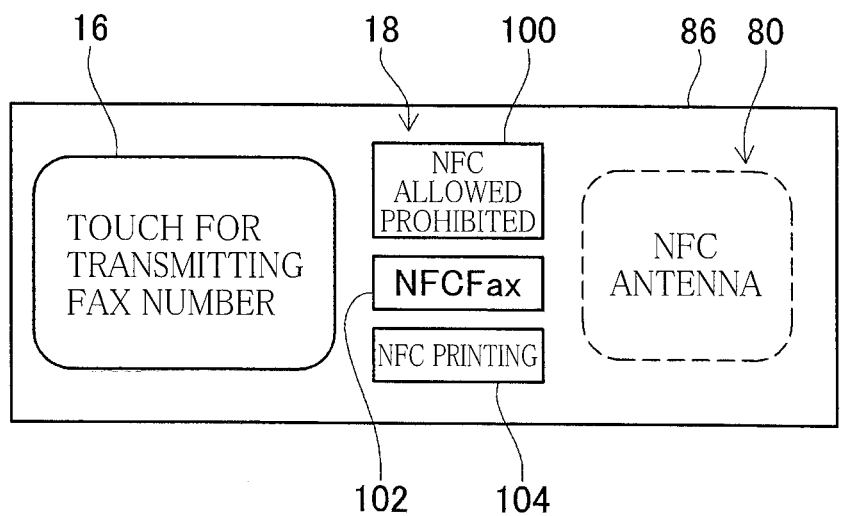
FIG. 4 is a view showing the panel 16, the button input portion 18, and the antenna portion 80 of the MFP 10.

As shown in FIG. 3, the antenna portion 80 is disposed at a right-side portion of the operation region 86, and the panel 16 is disposed at a left-side portion of the operation region 86. In the operation region 86, an LED (not shown) is provided so as to correspond to the antenna portion 80. When the LED is turned on, there are displayed, on the antenna portion 80, characters "NFC ANTENNA", as shown in FIG. 4. When the LED is turned off, the characters "NFC ANTENNA" disappear, as shown in FIG. 3. In the operation region 86, three operation keys 100, 102, 104 of the button input portion 18 are provided between the antenna portion 80 and the panel 16.

For establishing the NFC communication 60 between the MFP 10 and the mobile phone 70, the user brings the mobile phone 70 near to the antenna portion 80. When a distance between the mobile phone 70 and the antenna portion 80 falls within a communication area of wireless communication of the mobile phone 70 by the approach of the mobile phone 70 to the antenna portion 80, the NFC communication is established between the mobile phone 70 and the antenna portion 80, namely, between the mobile phone 70 and the MFP 10. Thus, the MFP 10 is capable of transmitting and receiving data such as facsimile numbers and images to and from the mobile phone 70 utilizing the NFC communication.

The MFP 10 is capable of executing facsimile communication utilizing the NFC communication and printing utilizing the NFC communication. In the facsimile communication utilizing the NFC communication, facsimile numbers and data of an image and the like to be transmitted by the facsimile communication are sent from the mobile phone 70 to the MFP 10 utilizing the NFC communication. In the printing utilizing the NFC communication, data of an image and the like to be printed is sent from the mobile phone 70 to the MFP 10 utilizing the NFC communication. On the basis of the data received by the MFP 10, the MFP 10 executes facsimile communication processing, printing processing, and so on. Hereinafter, the facsimile communication utilizing the NFC communication will be explained in detail.

In a normal state, there is displayed, on the panel 16 of the MFP 10, a screen for selecting an operation mode of the MFP utilizing the NFC communication. (This screen is hereinafter referred to as "mode selecting screen" where appropriate.) The mode selecting screen is one example of an image displayed on the panel 16, i.e., a displayed image. In the mode selecting screen, a message "SELECT MODE" is displayed, as shown in FIG. 3. The operation mode of the MFP 10 utilizing the NFC communication is an operation mode when the MFP 10 executes processing utilizing the NFC communication. The operation mode includes an operation mode for executing facsimile communication utilizing the NFC communication and an operation mode for executing printing utilizing the NFC communication. An operation key 102 is a button for selecting the operation mode for executing the facsimile communication utilizing the NFC communication. An operation key 104 is a button for selecting the operation mode for executing printing utilizing the NFC communication. Accordingly, where a user wishes for execution of the facsimile communication utilizing the NFC communication, the user operates the operation key 102 when the mode selecting screen is being displayed.

The user operation performed when the mode selecting screen is being displayed is a button operation for selecting the operation mode. Accordingly, the user does not bring the mobile phone 70 near to the antenna portion 80. Therefore, when the mode selecting screen is being displayed, the MFP 10 is in a state in which the NFC communication cannot be performed, namely, the NFC communication is disabled. In the state in which the NFC communication is disabled, the NFC communication is not established even if the user brings the mobile phone 70 near to the antenna portion 80. Thus, in an instance in which the NFC communication need not be established, the NFC communication is disabled, thereby making it possible to suppress electric power consumption. Further, in the state in which the NFC communication is disabled, the LED provided so as to correspond to the antenna portion 80 is turned off. Accordingly, the user is notified that the NFC communication is disabled, enhancing convenience.

When the operation key 102 is operated by the user, there is displayed, on the panel 16, a message "TOUCH FOR TRANSMITTING FAX NUMBER", as shown in FIG. 4. That is, there is displayed, on the panel 16, a screen for transmitting a facsimile number. (This screen is referred to as "number transmission screen" where appropriate.) The number transmission screen is one example of the displayed image. When the number transmission screen is displayed on the panel 16, it is expected that the user will bring the mobile phone 70 near to the antenna portion 80 following the message displayed on the number transmission screen. Therefore, when the number transmission screen is displayed on the panel 16, the MFP 10 is placed in a state in which the NFC communication can be performed, namely, the NFC communication is enabled. When the user brings the mobile phone 70 near to the antenna portion 80 in the state in which the NFC communication is enabled, the NFC communication is established. That is, where the user brings the mobile phone 70 near to the antenna portion 80 when the number transmission screen is being displayed on the panel 16 and the NFC communication is accordingly established, data relating to the facsimile number is sent from the mobile phone 70 to the MFP 10 utilizing the NFC communication. In the state in which the NFC communication is abled, the LED provided so as to correspond to the antenna portion 80 is turned on. Accordingly, the user is notified that the NFC communication is abled, enhancing convenience.

Figure 5:
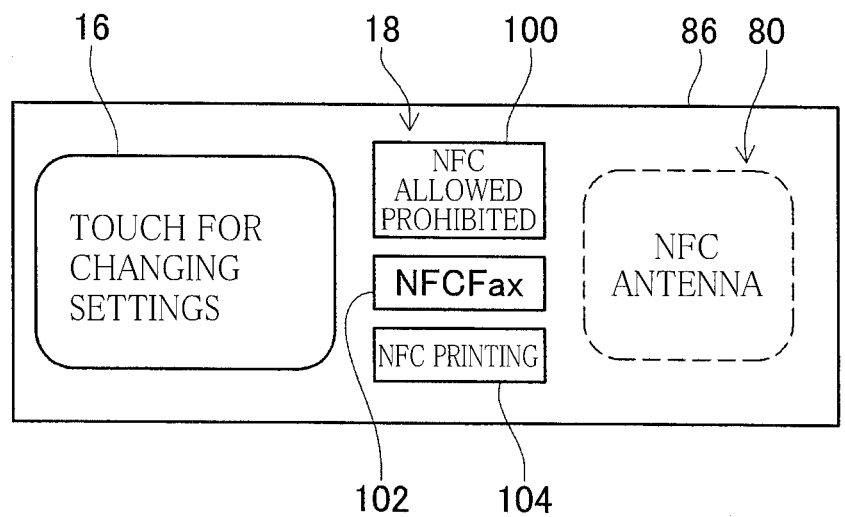
FIG. 5 is a view showing the panel 16, the button input portion 18, and the antenna portion 80 of the MFP 10.

When the MFP 10 received the data relating to the facsimile number, the MFP 10 stores the data in the data storage area 52, and a message "TOUCH FOR CHANGING SETTINGS" is displayed on the panel 16, as shown in FIG. 5. That is, there is displayed, on the panel 16, a screen for changing settings in the facsimile communication. (This screen will be hereinafter referred to as "setting change screen" where appropriate.) The setting change screen is one example of the displayed image. When the setting change screen is displayed on the panel 16, it is expected that the user will bring the mobile phone 70 near to the antenna portion 80 following the message displayed on the setting change screen. Therefore, when the setting change screen is displayed on the panel 16, the NFC communication is enabled. Accordingly, where the user brings the mobile phone 70 near to the antenna portion 80 when the setting change screen is being displayed on the panel 16 and the NFC communication is accordingly established, data relating to settings in the facsimile communication is sent from the mobile phone 70 to the MFP 10 utilizing the NFC communication.

Figure 6:
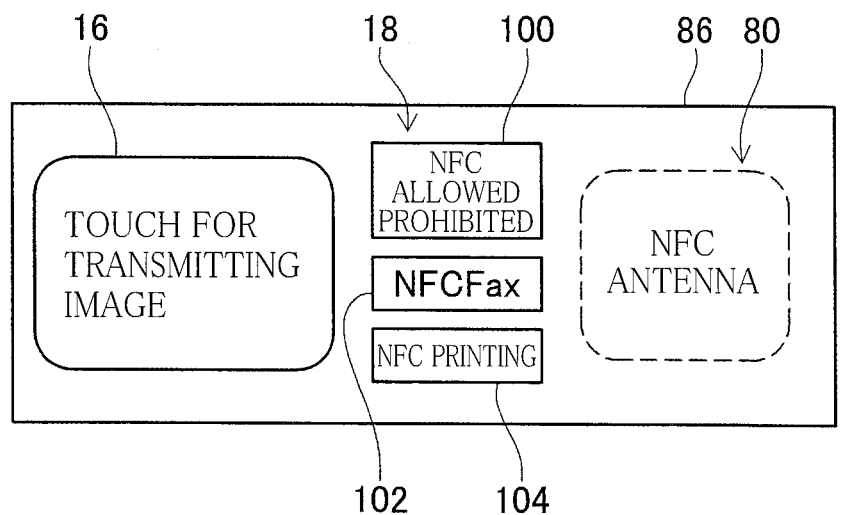
FIG. 6 is a view showing the panel 16, the button input portion 18, and the antenna portion 80 of the MFP 10.

When the MFP 10 receives the data relating to settings in the facsimile communication, the MFP 10 stores the data in the data storage area 52 and a message "TOUCH FOR TRANSMITTING IMAGE" is displayed on the panel 16, as shown in FIG. 6. That is, there is displayed, on the panel 16, a screen for transmitting an image used in the facsimile communication. (This screen will be hereinafter referred to as "image transmission screen" where appropriate.) The image transmission screen is one example of the displayed image. When the image transmission screen is displayed on the panel 16, it is expected that the user will bring the mobile phone 70 near to the antenna portion 80 following the message displayed on the image transmission screen. Therefore, when the image transmission screen is displayed on the panel 16, the NFC communication is enabled. Accordingly, where the user brings the mobile phone 70 near to the antenna portion 80 when the image transmission screen is being displayed on the panel 16 and the NFC communication is accordingly established, the image data is sent from the mobile phone 70 to the MFP 10 utilizing the NFC communication.

Figure 7:
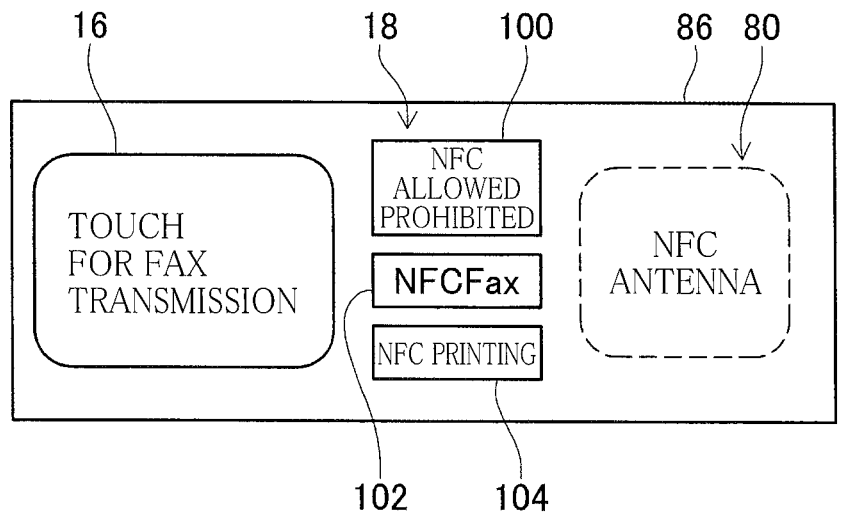
FIG. 7 is a view showing the panel 16, the button input portion 18, and the antenna portion 80 of the MFP 10.

When the MFP 10 receives the image data for the facsimile communication, the MFP 10 stores the data in the data storage area 52 and a message "TOUCH FOR FAX TRANSMISSION" is displayed on the panel 16, as shown in FIG. 7. That is, there is displayed, on the panel 16, a screen for executing the facsimile communication. (This screen will be hereinafter referred to as "communication execution screen" where appropriate.) The communication execution screen is one example of the displayed image. When the communication execution screen is displayed on the panel 16, it is expected that the user will bring the mobile phone 70 near to the antenna portion 80 following the message displayed on the communication execution screen. Therefore, when the communication execution screen is displayed on the panel 16, the NFC communication is enabled. Accordingly, where the user brings the mobile phone 70 near to the antenna portion 80 when the communication execution screen is being displayed on the panel 16 and the NEC communication is accordingly established, command data commanding execution of the facsimile communication is sent from the mobile phone 70 to the MFP 10 utilizing the NFC communication.

When the MFP 10 receives the command data, the MFP 10 executes the facsimile communication based on various data stored in the data storage area 52. More specifically, the MFP 10 sends the image data for the facsimile communication stored in the data storage area 52 to a destination device having the facsimile number stored in the data storage area 52 according to the settings stored in the data storage area 52. Thus, the facsimile communication utilizing the NFC communication is completed. As described above, in the MFP 10, the NFC communication is selectively enabled or disabled in accordance with a screen displayed on the panel 16 (hereinafter referred to as "displayed screen" where appropriate). In other words, where processing in accordance with the displayed screen (as one example of displayed-image-based processing) does not require processing utilizing the NFC communication (as one example of specific processing), the NFC communication is disabled. On the other hand, where the processing in accordance with the displayed screen requires the processing utilizing the NFC communication, namely, where the displayed-image-based processing is the specific processing, the NFC communication is enabled. According to the arrangement, it is possible to disable the NFC communication when the NFC communication is not executed, thereby suppressing electric power consumption.

The facsimile communication utilizing the NFC communication is executed by execution of the control program 50. In an instance where an application conforming to or compatible with the control program 50 (hereinafter referred to as "compatible application" where appropriate) is not being executed in the mobile phone 70, the data may not be sent from the mobile phone 70 to the MFP 10 even if the NFC communication is established. (The compatible application is one example of a predetermined program.) More specifically, there are programmed, in the compatible application, transmission of the data relating to the facsimile number when the number transmission screen is being displayed, transmission of the data relating to the facsimile setting change when the setting change screen is being displayed, transmission of the data relating to the image data for the facsimile communication when the image transmission screen is being displayed, and transmission of the command data when the communication execution screen is being executed. Accordingly, in the mobile phone 70 in which the compatible application is being executed, where the NFC communication is established when either one of the number transmission screen, the setting change screen, the image transmission screen, and the communication execution screen is being displayed on the panel 16, associated data is sent from the mobile phone 70 to the MFP 10, whereby the facsimile communication utilizing the NFC communication is executed.

There will be explained a case in which an application different from the compatible application (hereinafter referred to as "non-compatible application" where appropriate) is being executed in the mobile phone 70. In the present embodiment, the following non-compatible application will be explained by way of example. In the non-compatible application, there are programmed transmission of the data relating to the facsimile number when the number transmission screen is being displayed, transmission of the data relating to the image data for the facsimile communication when the image transmission screen is being displayed, and transmission of the command data when the communication execution screen is being executed. However, there is not programmed, in the non-compatible application, transmission of the data relating to the facsimile setting change when the setting change screen is being displayed. Accordingly, in the mobile phone 70 in which the non-compatible application is being executed, where the NFC communication is established when either one of the number transmission screen, the image transmission screen, and the communication execution screen is being displayed on the panel 16, associated data is sent from the mobile phone 70 to the MFP 10. However, even where the NFC communication is established when the setting change screen is being displayed on the panel 16, the data relating to the setting change is not sent from the mobile phone 70 to the MFP 10. Accordingly, the setting change cannot be executed.

Figure 8:
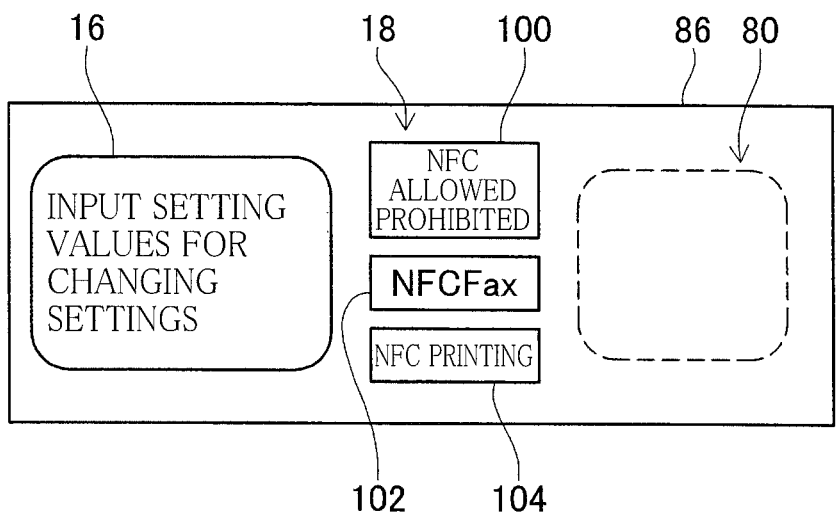
FIG. 8 is a view showing the panel 16, the button input portion 18, and the antenna portion 80 of the MFP 10.

Therefore, in the facsimile communication, utilizing the NFC communication, with the mobile phone 70 in which the non-compatible application is being executed, there is indicated on the setting change screen a message "INPUT SETTING VALUES FOR CHANGING SETTINGS", as shown in FIG. 8. As a result, the user recognizes that the setting values need to be input by button operations for changing the settings, whereby the setting values can be changed. The user operation to be performed when the setting change screen is being displayed is button operations for inputting the setting values and accordingly the user does not bring the mobile phone 70 near to the antenna portion 80. Therefore, the NFC communication is disabled when the setting change screen is being displayed, thereby suppressing the electric power consumption. The LED provided so as to correspond to the antenna portion 80 is turned off while the NFC communication is disabled.

It is noted that determination as to the application that is being executed in the mobile phone 70 is made on the basis of information sent from the mobile phone 70 to the MFP 10, utilizing the NFC communication. More specifically, when the NFC communication is established between the mobile phone 70 and the MFP 10, information for identifying the application that is being executed in the mobile phone 70 is sent from the mobile phone 70 to the MFP 10 utilizing the NFC communication. In the MFP 10, the application that is being executed in the mobile phone 70 is identified on the basis of the received information. Subsequently, determination is made as to which one of the compatible application and the non-compatible application is the one that is being executed in the mobile phone 70, and a display style on the setting change screen is changed and the NFC communication is selectively enabled or disabled, according to the determination.

Further, in the MFP 10, where it is determined that the non-compatible application is being executed in the mobile phone 70, there is indicated, on the panel 16, a screen encouraging execution of the compatible application by the mobile phone 70. More specifically, a message "COMPATIBLE APPLICATION IS EXECUTABLE?" is displayed on the panel 16, and two buttons, i.e., an executable button 110 and an unexecutable button 112, are also displayed, as shown in FIG. 9. The executable button 110 is a button to be operated where the compatible application is already installed in the mobile phone 70 and the compatible application is executable in the mobile phone 70. That is, when the executable button 110 is operated, the determination as to the application being executed in the mobile phone 70 is again made. Where it is determined that the compatible application is being executed in the mobile phone 70, the screens are displayed on the panel 16 in a display style in accordance with the compatible application and the NFC communication is selectively enabled or disabled. On the other hand, the unexecutable button 112 is a button to be operated where the compatible application is not installed in the mobile phone 70 and the compatible application is unexecutable in the mobile phone 70. Therefore, when the unexecutable button 112 is operated, the screens are displayed on the panel 16 in a display style in accordance with the non-compatible application and the NFC communication is selectively enabled or disabled.

The NFC communication is selectively enabled or disabled according to the displayed screen, on the basis of map data set for each application. To be more specific, there is stored, in the data storage area 52, map data corresponding to FIG. 10. (The map data corresponding to the compatible application is one example of a first determination criterion while the map data corresponding to the non-compatible application is one example of a second determination criterion.) The map data for each application is data by which is confirmed whether or not one processing in accordance with the displayed screen is the processing utilizing the NFC communication. In other words, the map data for each application includes a determination criterion based on which it is determined whether the one processing in accordance with the displayed screen on the panel 16 requires the processing based on the NFC communication. For instance, in either of the compatible application and the non-compatible application, processing in accordance with the mode selecting screen is button operations of the operation keys 102, 104, and accordingly the processing utilizing the NFC communication is not required. Further, in either of the compatible application and the non-compatible application, processing in accordance with the number transmission screen is transmission and reception of the data relating to the facsimile number utilizing the NFC communication. That is, the processing in accordance with the number transmission screen requires the processing utilizing the NFC communication in either of the compatible application and the non-compatible application. Further, in the compatible application, processing in accordance with the setting change screen is transmission and reception of the data relating to the setting change utilizing the NFC communication while, in the non-compatible application, processing in accordance with the setting change screen is button operations for inputting the setting values. Accordingly, the processing in accordance with the setting change screen requires the processing utilizing the NFC communication in the compatible application while does not require the processing utilizing the NFC communication in the non-compatible application. By thus referring to the map data corresponding to FIG. 10, it is possible to appropriately determine whether the one displayed screen is being displayed on the panel 16, and the NFC communication can be selectively enabled or disabled for each application according to the displayed screen. In the present embodiment, therefore, for certain displayed-image-based processing, the controller determines based on the first determination criterion that the certain displayed-image-based processing is the specific processing and determines based on the second determination criterion that the certain displayed-image-based processing is not the specific processing.

The MFP 10 is configured to be selectively placed in one of an NFC-communication-allowed state (as one example of a communication-allowed state) in which the NFC communication is allowed to be performed and an NFC-communication-prohibited state (as one example of a communication-prohibited state) in which the NFC communication is prohibited from being performed. More specifically, the operation key (as one example of an acceptor) 100 is a button for switching the state of the MFP 10 between the NFC-communication-allowed state and the NFC-communication-prohibited state. By operating the operation key 100, the state of the MFP 10 is switched between the NFC-communication-allowed state and the NFC-communication-prohibited state. In the NFC-communication-prohibited state, the NFC communication is not performable regardless of which displayed screen is being displayed. On the other hand, in the NFC-communication-allowed state, the NFC communication is performable in accordance with the displayed screen that is being displayed on the panel 16. That is, the facsimile communication utilizing the NFC communication is executed in the NFC-communication-allowed state and cannot be executed in the NFC-communication-prohibited state.

<Control Program>

Figure 11:
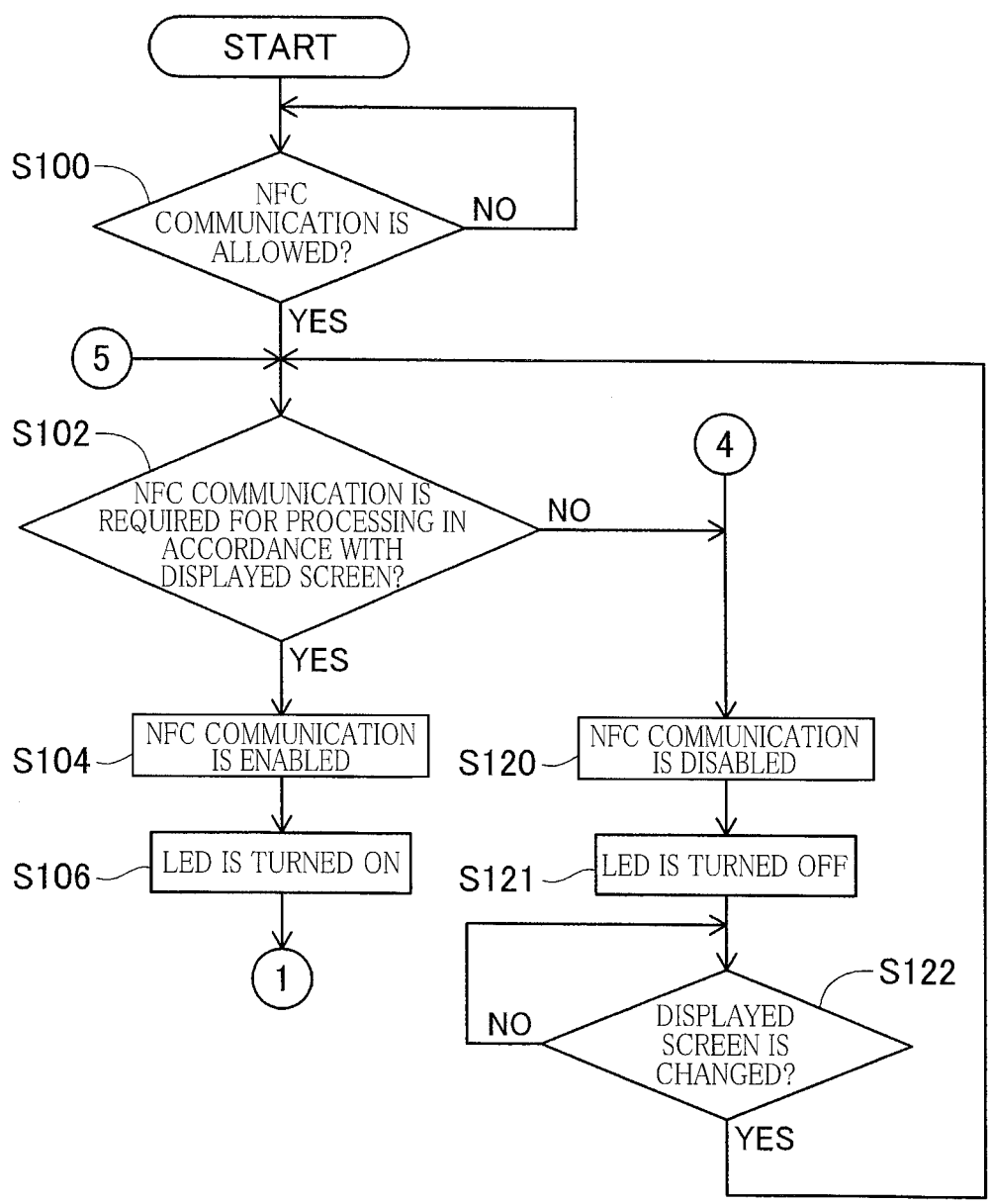
FIG. 11 is a flow chart showing processing in the MFP 10.
Figure 12:
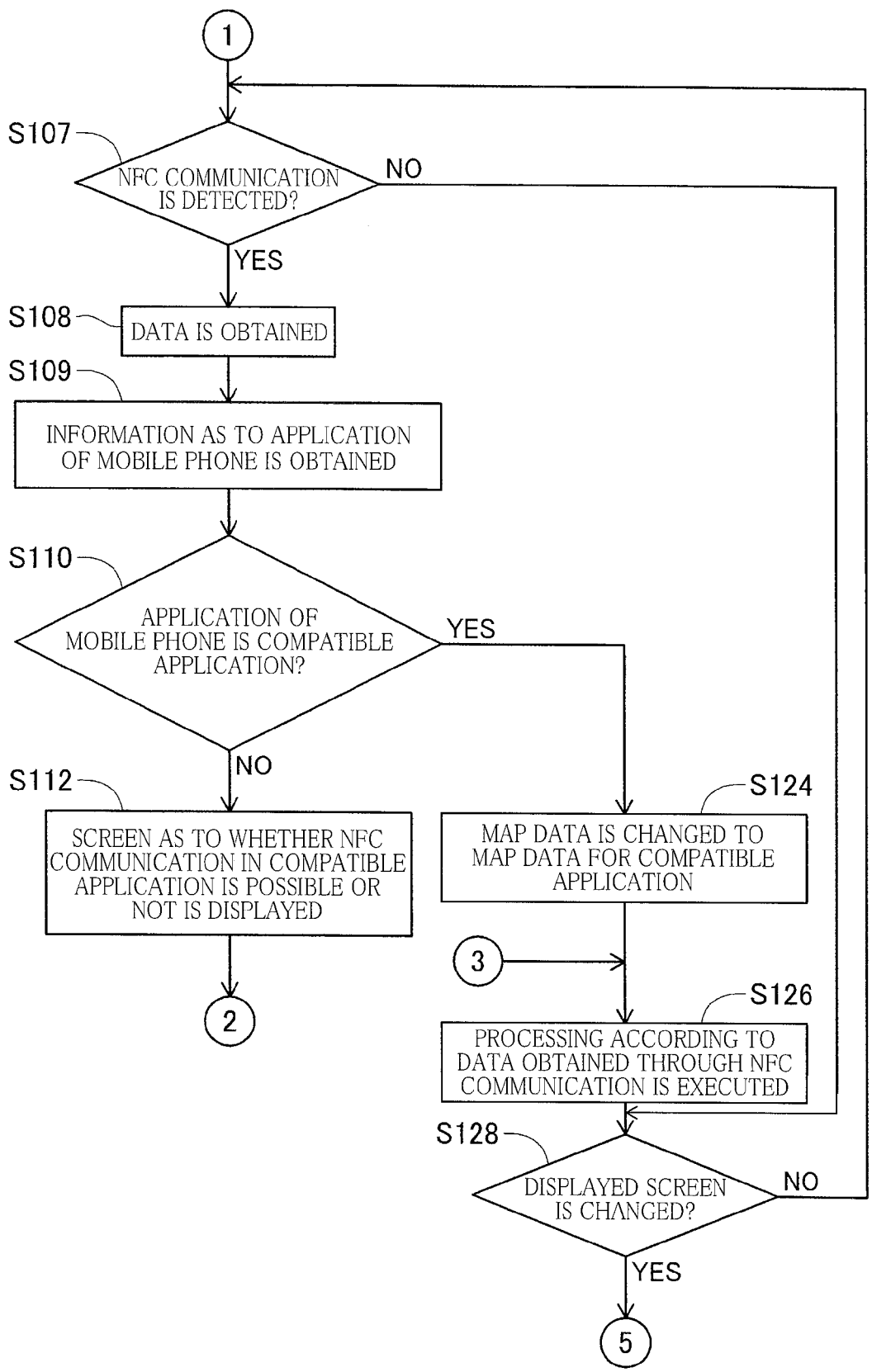
FIG. 12 is a flow chart showing processing in the MFP 10.
Figure 13:
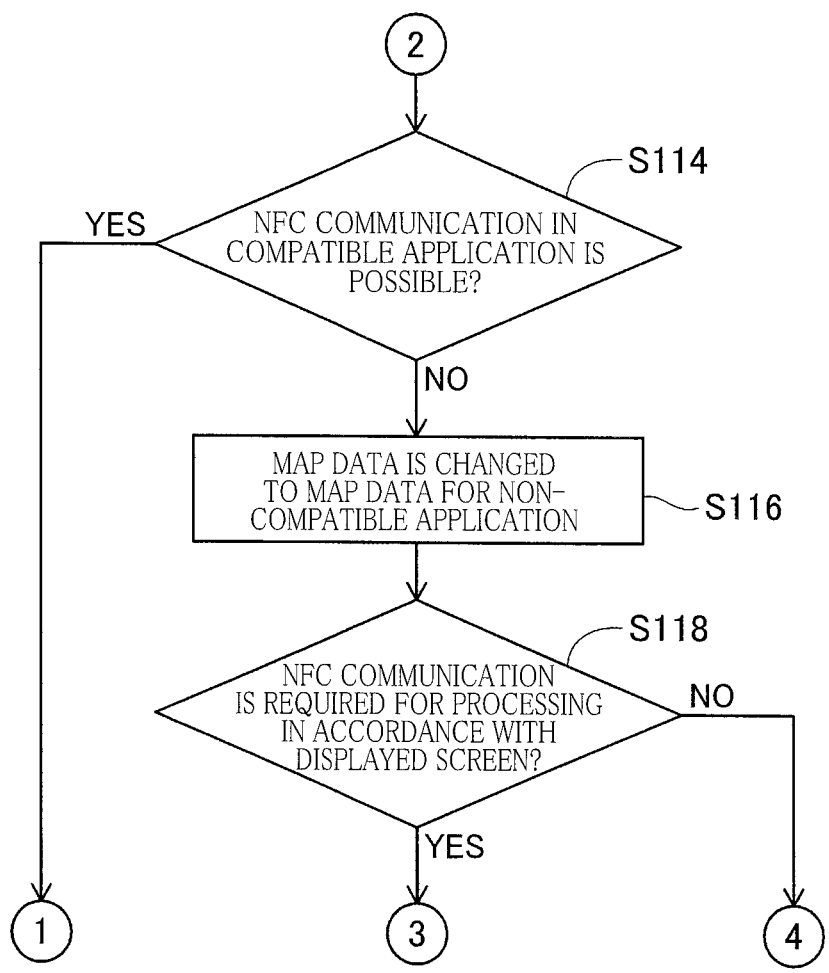
FIG. 13 is a flow chart showing processing in the MFP 10.

The facsimile communication utilizing the NFC communication is executed by execution of the control program 50 by the CPU 12. With reference to FIGS. 11-13, there will be concretely explained a flow for selectively enabling or disabling the NFC communication in accordance with the displayed screen. The program is repeatedly executed when the MFP 10 is turned on.

According to the control program 50, it is judged by the CPU 12 whether or not the MFP 10 is in the NFC-communication-allowed state (Step 100). (Hereinafter, "Step" is abbreviated as "S".) That is, it is judged whether the state of the MFP 10 has been changed to the NFC-communication-allowed state by an operation on the operation key 100. If the MFP 10 is not in the NFC-communication-allowed state (S100: NO), the processing in S100 is repeated.

On the other hand, if the MFP 10 is in the NFC-communication-allowed state (S100: YES), it is judged by the CPU 12 whether or not the processing in accordance with a certain displayed screen requires the processing utilizing the NFC communication (S102). More specifically, it is judged for the compatible application whether or not the processing in accordance with the displayed screen requires the processing utilizing the NFC communication, by using the map data corresponding to FIG. 10. In other words, when the mode selecting screen is being displayed on the panel 16, it is judged that the processing utilizing the NFC communication is not required. On the other hand, when either one of the number transmission screen, the setting change screen, the image transmission screen, and the communication execution screen is being displayed on the panel 16, it is judged that the processing utilizing the NFC communication is required.

If the processing in accordance with the displayed screen requires the processing utilizing the NFC communication (S102: YES), the NFC communication is enabled (S104). In this case, the LED provided so as to correspond to the antenna portion 80 is turned on (S106). It is then judged by the CPU 12 whether or not the NFC communication is detected (S107). If the NFC communication is not detected (S107: NO), the control flow proceeds to S128.

On the other hand, if the NFC communication is detected (S107: YES), the data associated with the displayed screen is sent from the mobile phone 70 to the MFP 10 utilizing the NFC communication, and the MFP 10 receives the data (S108). To be more specific, the MFP 10 receives: the data relating to the facsimile number when the number transmission screen is being displayed on the panel 16; the data relating to the facsimile settings when the setting change screen is being displayed on the panel 16; the image data for the facsimile communication when the image transmission screen is being displayed on the panel 16; and the command data for the facsimile communication when the communication execution screen is being displayed on the panel 16.

Subsequently, there is sent, from the mobile phone 70 to the MFP 10, information for identifying the application that is being executed in the mobile phone 70, utilizing the NFC communication, and the MFP 10 obtains the information (S109). On the basis of the obtained information, the application that is being executed in the mobile phone 70 is identified, and it is judged by the CPU 12 whether or not the application that is being executed in the mobile phone 70 is the compatible application or not (S110). To be more specific, identification information for identifying the compatible application is stored in the storage 14. Where the identification information and the information obtained in S109 indicate the same application, it is judged that the application that is being executed in the mobile phone 70 is the compatible application. On the other hand, where the identification information and the information obtained in S109 indicate mutually different applications or where no information is obtained in S109, it is judged that the application that is being executed in the mobile phone 70 is not the compatible application.

If the application that is being executed in the mobile phone 70 is not the compatible application, namely, if the application that is being executed in the mobile phone 70 is the non-compatible application (S110: NO), the screen shown in FIG. 9 is displayed on the panel 16 (S112). That is, the message "COMPATIBLE APPLICATION IS EXECUTABLE?" is displayed on the panel 16, and the executable button 110 and the unexecutable button 112 are also displayed. Subsequently, it is judged by the CPU 12 whether it is possible or impossible to execute the compatible application in the mobile phone 70 (S114). To be more specific, it is judged that the compatible application can be executed in the mobile phone 70 in an instance where the executable button 110 is operated while it is judged that the compatible application cannot be executed in the mobile phone 70 in an instance where the unexecutable button 112 is operated.

If the compatible application can be executed in the mobile phone 70 (S114: YES), the control flow returns to S108. On the other hand, if the compatible application cannot be executed in the mobile phone 70 (S114: NO), the map data for determining whether or not the processing in accordance with each displayed screen requires the processing utilizing the NFC communication is changed from the map data for the compatible application to the map data for the non-compatible application (S116).

Subsequently, it is judged by the CPU 12 whether or not the processing in accordance with the displayed screen requires the processing utilizing the NFC communication (S118). More specifically, it is judged for the non-compatible application whether or not the processing in accordance with the displayed screen requires the processing utilizing the NFC communication, by using the map data corresponding to FIG. 10. In other words, when the mode selecting screen or the setting change screen is being displayed on the panel 16, it is judged that the processing utilizing the NFC communication is not required. On the other hand, when either one of the number transmission screen, the image transmission screen, and the communication execution screen is being displayed on the panel 16, it is judged that the processing utilizing the NFC communication is required.

If the processing in accordance with the displayed screen does not require the processing utilizing the NFC communication (S118: NO), the NFC communication is disabled (S120). In this instance, the LED provided so as to correspond to the antenna portion 80 is turned off (S121). It is then judged by the CPU 12 whether or not the displayed screen on the panel 16 is changed to another displayed screen (S122). If the displayed screen on the panel 16 is not changed (S122: NO), the processing in S122 is repeated. On the other hand, if the displayed screen on the panel 16 is changed (S122: YES), the control flow returns to S102.

If it is judged in S118 that the processing in accordance with the displayed screen on the panel 16 requires the processing utilizing the NFC communication (S118: YES), there is executed processing according to the data obtained through the NFC communication, namely, the data obtained in S108 (S126). More specifically, where the data relating to the facsimile number, the data relating to the facsimile communication settings, or the image data for the facsimile communication is obtained, the data is stored in the data storage area 52. Where the command data for the facsimile communication is obtained, the facsimile communication is executed based on the data stored in the data storage area 52.

Subsequently, it is judged by the CPU 12 whether or not the displayed screen on the panel 16 is changed (S128). If the displayed screen on the panel 16 is not changed (S128: NO), the control flow returns to S107. On the other hand, the displayed screen on the panel 16 is changed (S128: YES), the control flow returns to S102.

If it is judged in S110 that the application that is being executed in the mobile phone 70 is the compatible application (S110: YES), the map data for determining whether or not the processing in accordance with each displayed screen requires the processing utilizing the NFC communication is changed from the map data for the non-compatible application to the map data for the compatible application (S124). In this respect, in an instance where the map data for determining necessity or unnecessity of the processing utilizing the NFC communication is the map data for the compatible application, the map data for the compatible application is maintained. The control flow then goes to S126, and processing in subsequent steps is executed.

If it is judged in S102 that the processing in accordance with the displayed screen does not require the processing utilizing the NFC communication (S102: NO), the control flow proceeds to S120, and processing in subsequent steps is executed.

<Functional Structure of CPU>

It may be considered that the CPU 12 configured to execute the control program 50 described above has a functional structure shown in FIG. 1 in view of processing executed by the CPU 12. As apparent from FIG. 1, the CPU 12 has an executing portion 130, a determining portion 132, a changing portion 134, a notifying portion, an obtaining portion, and a display portion.

The executing portion 130 is a functional portion to execute the processing in S108, S126 of the control program 50, namely, a functional portion to execute the processing in accordance with the NFC communication. The determining portion 132 is a functional portion to execute the processing in S102, S118 of the control program 50, namely, a functional portion to determine the processing in accordance with the displayed screen requires the processing in accordance with the NFC communication. The changing portion 134 is a functional portion to execute the processing in S104, S120 of the control program 50, namely, a functional portion to selectively enabling or disabling the NFC communication according to the displayed screen. The notifying portion 136 is a functional portion to execute the processing in S106 of the control program 50, namely, a functional portion to turn on the LED when the NFC communication is enabled. The obtaining portion 138 is a functional portion to execute the processing in S109 of the control program 50, namely, a functional portion to obtain the data relating to the application that is being executed in the mobile phone 70, utilizing the NFC communication. The display portion 140 is a functional portion to execute the processing in S112 of the control program 50, namely, a functional portion to display, on the panel 16, the screen asking whether the compatible application is executable or unexecutable in the mobile phone 70.

<Advantages of Embodiment>

The communication device constructed as described above is configured such that the controller executes specific processing in which the controller obtains data from the information processing terminal utilizing the near field communication and executes process in accordance with the obtained data. Where the displayed-image-based processing that is processing in accordance with the image displayed on the display is the specific processing, the controller does not stop the communication function by the near field communicator, namely, the controller activates the communication function by the near field communicator. On the other hand, where the displayed-image-based processing is not the specific processing, the controller stops the communication function by the near field communicator, namely, the controller inactivates the communication function by the near field communicator. That is, where it is required to utilize the near field communication when the displayed-image-based processing is executed, the near field communication is enabled. On the other hand, where it is not required to utilize the near field communication when the displayed-image-based processing is executed, the near field communication is disabled. Accordingly, it is possible to enable the near field communication only when the near field communication is required, thereby suppressing electric power consumption.

The communication device constructed as described above is configured so as to be selectively placed in the communication-allowed state in which the near field communication is allowed to be performed and a communication-prohibited state in which the near field communication is prohibited from being performed. In other words, the state of the communication device is switched between the communication-allowed state and the communication-prohibited state. Where it is required to utilize the near field communication when the displayed-image-based processing is executed in the communication-allowed state, the near field communication is enabled. On the other hand, where it is not required to utilize the near field communication, the near field communication is disabled. Further, even if it is required to utilize the near field communication when the displayed-image-based processing is executed, the near field communication is disabled in the communication-prohibited state. Accordingly, the near field communication can be always disabled in the communication-prohibited state, thereby further suppressing electric power consumption.

In the communication device constructed as described above, it is possible to notify the user that the near field communication is enabled when the near field communication is enabled. Accordingly, the user can recognize that the near field communication is enabled, so that operability is enhanced.

In the communication device constructed as described above, it is possible to obtain information for identifying a program by which the information processing terminal sends data to the communication device, utilizing the near field communication. Where the program identified by the obtained information is identical with a predetermined program pre-stored in the communication device, the necessity or unnecessity of the near field communication when the displayed-image-based processing is executed is determined based on a first determination criterion. On the other hand, where the program identified by the obtained information is different from the predetermined program, the necessity or unnecessity of the near field communication when the displayed-image-based processing is executed is determined based on a second determination criterion. Accordingly, it is possible to appropriately determine the necessity or unnecessity of the near field communication when the displayed-image-based processing is executed with respect to the information processing terminal that executes the program different from the predetermined program pre-stored in the communication device.

In the communication device constructed as described above, the necessity or unnecessity of the near field communication when the displayed-image-based processing is executed is determined based on the first determination criterion before the information as to the program is obtained from the information processing terminal. On the other hand, where the program that is being executed in the information processing terminal is not the predetermined program, the necessity or unnecessity of the near field communication when the displayed-image-based processing is executed is determined based on the second determination criterion after the information as to the program is obtained from the information processing terminal. Accordingly, it is possible to appropriately determine the necessity or unnecessity of the near field communication when the displayed-image-based processing is executed, for each of various programs.

In the communication device constructed as described above, where the program identified by the obtained information is different from the predetermined program pre-stored in the communication device, it is possible to display, on the display, an image recommending execution of the predetermined program. Accordingly, the predetermined program can be executed in the information processing terminal, making it possible to appropriately determine the necessity or unnecessity of the near field communication when the displayed-image-based processing is executed.

In the communication device constructed as described above, it is possible to determine with respect to certain displayed-image-based processing based on the first determination criterion that it is required to utilize the near field communication when the certain displayed-image-based processing is executed and to determine with respect to the certain displayed-image-based processing based on the second determination criterion that it is not required to utilize the near field communication when the certain displayed-image-based processing is executed. In other words, the necessity or unnecessity of the near field communication when the certain displayed-image-based processing is executed can be determined giving a higher priority to the second determination criterion than the first determination criterion. Accordingly, it is possible to appropriately determine the necessity or unnecessity of the near field communication when the displayed-image-based processing is executed with respect to the information processing terminal that executes the program different from the predetermined program pre-stored in the communication device.

In the communication device constructed as described above, there is stored data by which is confirmed whether the displayed-image-based processing is the specific processing indicated above, and the necessity or unnecessity of the near field communication when the displayed-image-based processing is executed can be determined based on the data. That is, the data for confirming whether the displayed-image-based processing is the specific processing is stored as the map data, and the necessity or unnecessity of the near field communication when the displayed-image-based processing is executed can be determined referring to the map data. Accordingly, the necessity or unnecessity of the near field communication when the displayed-image-based processing is executed can be easily determined.

<Modified Example>

It is to be understood that the present invention is not limited to the details of the embodiment illustrated above, but may be embodied with various changes and modifications, which may occur to those skilled in the art. In the illustrated embodiment, the NFC communication is selectively enabled or disabled according to the displayed screen when the facsimile communication utilizing the NFC communication is executed. Alternatively, the NFC communication may be selectively enabled or disabled according to the displayed screen when various processing, such as printing, utilizing the NFC communication is executed.

In the illustrated embodiment, the MFP 10 is employed as the communication device configured to perform the NFC communication with the mobile phone 70. Alternatively, as the communication device, there may be employed various devices such as printers and personal computers (PC).

In the illustrated embodiment, the mobile phone 70 is employed as the information processing terminal configured to perform the NFC communication with the MFP 10. Alternatively, as the information processing terminal, tablet devices, smartphones, and so on may be employed.

In the illustrated embodiment, the wireless communication according to NFC is employed as the near field communication. Alternatively, it is possible to employ wireless communication according to Transfer Jet or the like.

In the illustrated embodiment, the processing shown in FIGS. 11-13 is executed by the CPU 12. The processing may be executed by an ASIC and other logic integrated circuits. The CPU 12, the ASIC, and other logic integrated circuits may cooperate with one another to execute the processing.

What is claimed is:

1. A communication device, comprising:
 a near field communicator configured to perform near field communication with an information processing terminal present in a communication area in which near field communication is possible, the information processing terminal being capable of performing the near field communication;

a display configured to display an image; and a controller configured to control the communication device and to execute specific processing in which the controller obtains data from the information processing terminal utilizing the near field communication and executes process in accordance with the obtained data, wherein the controller is configured to determine, when an image is being displayed on the display, whether displayed-image-based processing that is processing in accordance with the image displayed on the display is the specific processing, and wherein the controller is configured to inactivate a communication function of the near field communicator if it is determined that the displayed-image-based processing is not the specific processing and to activate the communication function of the near field communicator if it is determined that the displayed-image-based processing is the specific processing.

2. The communication device according to claim 1, further comprising an acceptor configured to accept switching to one of a communication-allowed state in which the near field communication by the near field communicator is allowed and a communication-prohibited state in which the near field communication by the near field communicator is prohibited, wherein the controller is configured to inactivate the communication function by the near field communicator if it is determined that the displayed-image-based processing is not the specific processing and to activate the communication function by the near field communicator if it is determined that the displayed-image-based processing is the specific processing, on condition that the acceptor has accepted the switching to the communication-allowed state.

3. The communication device according to claim 2, wherein the controller is configured to inactivate the communication function by the near field communicator even if it is determined that the displayed-image-based processing is the specific processing, on condition that the acceptor has accepted the switching to the communication-prohibited state.

4. The communication device according to claim 1, wherein the controller is configured to notify a user that the communication function by the near field communicator is activated in a situation in which the communication function is activated.

5. The communication device according to claim 1, further comprising a first storage in which is stored identification information for identifying a predetermined program, wherein the controller is configured to obtain information for identifying a program by which the information processing terminal sends data to the communication device, utilizing the near field communication, and wherein the controller is configured to determine based on a first determination criterion whether the displayed-image-based processing is the specific processing, in an instance where the program identified by the obtained information is identical with the predetermined program, and wherein the controller is configured to determine based on a second determination criterion different from the first determination criterion whether the displayed-image-based processing is the specific processing, in an instance where the program is different from the predetermined program.

6. The communication device according to claim 5, wherein the controller is configured to determine whether the displayed-image-based processing is the specific processing based on the first determination criterion before the information as to the program is obtained.

7. The communication device according to claim 5, wherein the controller is configured to determine whether the displayed-image-based processing is the specific processing based on the second determination criterion after the information as to the program is obtained.

8. The communication device according to claim 5, wherein the controller is configured to display, on the display, an image indicating that it is recommended for the information processing terminal to transmit the data by execution of the predetermined program, in an instance where the program identified by the obtained information is different from the predetermined program.

9. The communication device according to claim 5, wherein, for certain displayed-image-based processing, the controller determines based on the first determination criterion that the certain displayed-image-based processing is the specific processing and determines based on the second determination criterion that the certain displayed-image-based processing is not the specific processing.

10. The communication device according to claim 1, further comprising a second storage in which is stored data by which is confirmed whether the displayed-image-based processing is the specific processing, wherein the controller is configured to determine whether the displayed-image-based processing is the specific processing, based on the data stored in the second storage.

11. A non-transitory computer-readable storage medium in which is stored a program to be executed by a computer of a communication device, comprising: a near field communicator configured to perform near field communication with an information processing terminal present in a communication area in which near field communication is possible, the information processing terminal being capable of performing the near field communication; and a display configured to display an image, wherein the program permits the computer to function as a controller configured to execute specific processing in which the controller obtains data from the information processing terminal utilizing the near field communication and executes process in accordance with the obtained data, and wherein the program permits the computer to function as a controller configured to:

determine, when an image is being displayed on the display, whether displayed-image-based processing that is processing in accordance with the image displayed on the display is the specific processing, and inactivate a communication function of the near field communicator if it is determined that the displayed-image-based processing is not the specific processing and activate the communication function of the near field communicator if it is determined that the displayed-image-based processing is the specific processing.

* * * * *